United States Patent [19]

Menzel

[11] Patent Number: 5,595,800
[45] Date of Patent: Jan. 21, 1997

[54] HELICALLY WOUND REINFORCED RIBBED COMPOSITE STRUCTURE

[75] Inventor: Stanley W. O. Menzel, Dry Creek, Australia

[73] Assignee: Rib Loc Australia Pty Ltd., South Australia, Australia

[21] Appl. No.: 211,286

[22] PCT Filed: Sep. 30, 1992

[86] PCT No.: PCT/AU92/00522

§ 371 Date: Mar. 29, 1994

§ 102(e) Date: Mar. 29, 1994

[87] PCT Pub. No.: WO93/07412

PCT Pub. Date: Apr. 15, 1993

[30] Foreign Application Priority Data

Oct. 2, 1991 [AU] Australia ................... PK8668

[51] Int. Cl.$^6$ ............... B31C 3/00; B31C 3/04; B29D 23/22
[52] U.S. Cl. .......... 428/363; 428/34.1; 428/34.5; 428/34.6; 428/34.7; 428/36.91; 428/36.92
[58] Field of Search ............... 428/34.1, 34.5, 428/34.6, 34.7, 36.3, 36.91, 36.92; 138/172, 177, 178

[56] References Cited

U.S. PATENT DOCUMENTS 3,996,783  12/1976  Meserole .

FOREIGN PATENT DOCUMENTS

| 61091/86 | 2/1988 | Australia . |
|---|---|---|
| B-22369/88 | 3/1989 | Australia . |
| PCT/AU92/ 00522 | 1/1993 | Australia . |
| WO88/00129 | 1/1988 | WIPO . |

Primary Examiner—Patrick Ryan
Assistant Examiner—Rich Weisberger
Attorney, Agent, or Firm—Klauber & Jackson

[57] ABSTRACT

This invention relates to improvements to reinforced ribbed structures, and in particular to reinforced or strengthened spirally wound pipes or tubes made from composite materials.

14 Claims, 4 Drawing Sheets 5,595,800

HELICALLY WOUND REINFORCED RIBBED COMPOSITE STRUCTURE

This invention relates to improvements to reinforced ribbed structures, and in particular to reinforced or strengthened spirally wound pipes or tubes made from composite materials.

It is well known that plastic pipes can be made by spirally winding a plastic strip having a series of spaced apart upstanding ribs extending longitudinally of the strip, either at room temperature or at an elevated temperature where the plastic becomes more flexible. This form of helically wound tube is already well known in the industry and is described in Patents by the same inventor relating both to the form of the plastic strip and the form of the machine by means of which the pipes or tubes are produced from such strips.

For these pipes to perform in a high performance application, in order to attain the necessary degree of strength, the wall thickness of the plastic strip must be quite substantial, as well as that of the ribs, or the finished pipes or tubes can be reinforced with strengthening or reinforcing members. In this regard reference is made to the applicant's Australian Patent 607431 which discloses a method of producing a reinforced plastics tube utilising a reinforcing member placed between the ribs in such a manner that the deflection resistance of the finished pipe or tube is materially increased. The reinforcing member comprises a metal strip of U-shape cross-section, the free ends of the reinforcing member being designed to engage beneath opposed flange formations of a pair of adjacent ribs to thereby lock the metal strip in position between the ribs and in turn stiffen the ribs and the finished pipe. As explained in the aforesaid Patent specification, in applications where the reinforced tubes or pipes are buried in a trench or subjected to high earth loads, the strength of the pipe or tube is of extreme importance.

An object of the present invention is to provide certain improvements, beyond those disclosed in the aforesaid Patent Specification 607431, to reinforced spirally wound plastics tube or pipe, which are effective to stiffen the tube or pipe through the addition of reinforcing members formed of recycled low cost plastics material or of metal (or both) to thereby produce a composite plastics structure.

It is another object of the present invention to provide a spirally wound plastics pipe formed of two or more materials having different characteristics so that the resultant or finished pipe or tube has enhanced properties, and which can be produced at relatively low cost.

According to one embodiment of this invention, there is provided a helically or spirally wound composite tube or pipe produced by helically winding a strip of plastics material and interengaging the adjacent edges of adjacent convolutions of the strip, wherein the strip comprises an array of lengthwise extending ribs spaced apart across the width of the strip so as to form therebetween a series of open longitudinally extending side by side channels, each of at least some of said ribs having flange formations at or near its free end to strengthen such ribs, each of the flange formations being separated from the flange formation on any adjacent rib, characterised by at least one non-planar elongate helical reinforcing member located between a pair of said ribs within the array, the marginal edges of the reinforcing member interlocking with the flange formations of the ribs of said pair, said reinforcing member having a central body portion of inverted U- or V-shaped cross-section which has a radial height greater than the height of said ribs whereby the effective external diameter of the composite tube or pipe is substantially increased. With this arrangement, a composite plastic pipe of extremely high stiffness can be produced.

The reinforcing member can be applied during the winding of the tube, and can be fed continually or at required intervals so that a plurality of separate helical members are spaced along the length of the tube being wound. Alternatively the reinforcing member can be wound around the tube after it has been formed, being located in one or more spaces between the T-shaped ribs on the outer surface of the wound tube.

Preferably, the reinforcing member is a roll-formed metal strip.

In one preferred arrangement, the strip reinforcing member has a profile which comprises an inverted V or U-shaped central body portion flanked on each side by an outwardly directed divergent flange, the free end of each said flange engaging beneath a flange formation of a respective said upstanding rib. In another arrangement, the inverted V or U-shaped central body portion straddles at least one of said ribs, whereby the strip reinforcing member spans between a pair of alternate said ribs.

In yet another preferred arrangement, the strip reinforcing member is encased in a resilient or a plastic sheath, e.g. by extruding plastic over the strip member which is preferably made from steel, or at least has its outer "exposed" surface coated with a protective plastics layer.

In yet another preferred embodiment of the invention, at least some of said longitudinally extending side by side channels are filled with a strengthening and protective filler material which can be of recycled plastic (being compatible with the plastic strip) or a combination of plastics and fibrous material. The filler material can be applied to the pipe, in molten form, as the pipe issues from the helical winding machine, the molten material bonding to the outer walls of the spirally formed pipe and/or the outer surface of the strip reinforcing member. Alternatively the filler material can be applied by extrusion in the form of a web which extends across the radially outer surfaces of the flanges of the ribs and overlies the outer surface of the reinforcing member.

In yet another preferred embodiment of the invention, an elongated cover strip of recycled plastics material overlies the strip reinforcing member and is co-extensive therewith, the cover member having marginal edge portions which are designed to interlock with the flange formations of said ribs. The cover member can provide some additional stiffness to the finished pipe or tube.

In cases where the reinforced composite tube or pipe is used to re-line underground sewers, the reinforcement member, when appropriately configured, can assist in maintaining the liner tube approximately centrally of the failed pipeline, and a uniform annulus of grout can be maintained around the liner tube. In addition, the steel reinforcement member can stiffen the liner tube to such an extent that when grout is pumped into the annulus between the liner and the failed pipe, the composite reinforced liner is able to bear the grouting pressures, whereas a simple unreinforced plastic liner will require filling with water to withstand such pressures. With the reinforced structure of this invention therefore, a pipe can have a liner installed and then grouted with the sewer still flowing which is extremely advantageous to the contractor.

According to another aspect of the present invention, there is provided an elongate strip of plastics material for forming articles by helically winding the strip and interengaging adjacent edges of the convolutions of the strip thus wound, wherein said strip comprises a plurality of longitudinally extending rib formations spaced apart across the width of the strip on at least one side thereof to form therebetween a series of open longitudinally extending side by side channels, wherein each said rib formation comprises a pair of opposed closely spaced upstanding ribs which define therebetween an outwardly facing slot-like cavity, the slot-like cavity being arranged to lockingly retain an extremity of an elongate reinforcing member applied to the helically wound pipe or tube.

Preferably, the opposite inner walls of the slot-like cavity are provided with barbs or teeth, and the reinforcing member is of T-shaped cross-section with the vertical limb also being barbed, the barbed vertical limb being pressed into the slot-like cavity between the upstanding ribs of a said rib formation, to thereby lock the T-shaped reinforcing member in place.

In another variation, the reinforcing member is of approximately inverted U-shaped cross-section, the free ends of the opposed limbs of the reinforcing member each being lockingly retained in the slot-like cavity of a respective said rib formation, the bridge portion of the reinforcing member being spaced radially outwards of the end surfaces of the ribs.

According to yet another aspect of the present invention, the spirally wound reinforced composite tube or pipe is subjected to a deformation process which permanently deforms the metal reinforcing member and converts the tube or pipe from a circular to a non-circular cross-sectional shape, the tube or pipe being retained in its non-circular shape by means of the permanently deformed metal reinforcing member(s) wound therearound. This provides a very simple and effective means for producing non-circular plastics tubes or pipes without the need of heat to deform the plastics strip material.

In order to further illustrate the present invention, several embodiments are described hereunder in some further detail with reference to the accompanying drawings in which.

Figure 1:
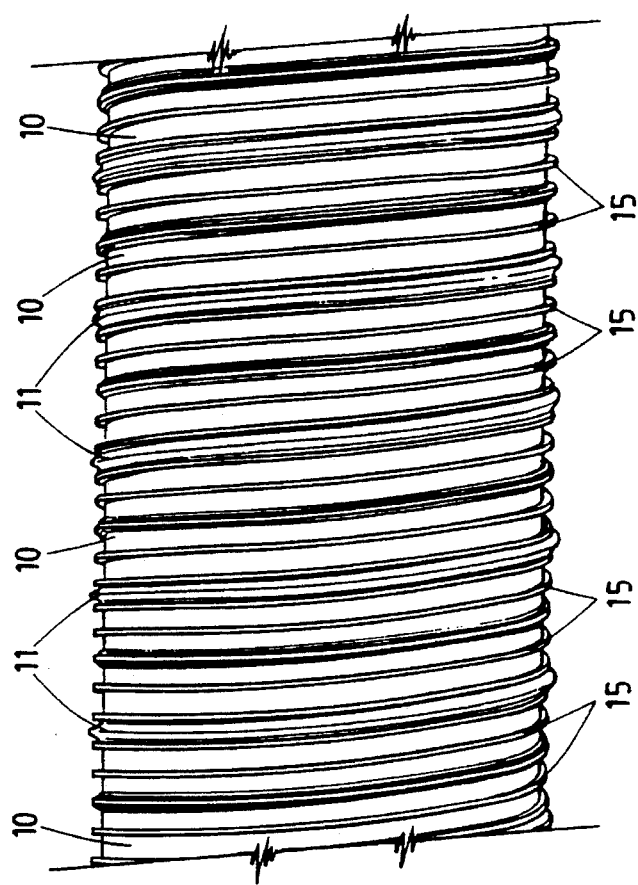
FIG. 1 is an elevational view of a reinforced pipe constructed according to a first embodiment of the invention.
Figure 2:
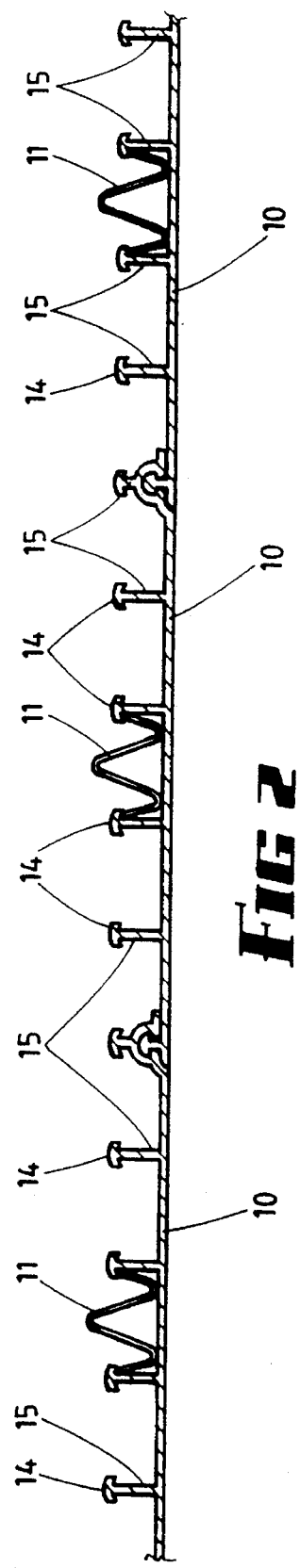
FIG. 2 is a part transverse sectional view of the pipe shown in FIG. 1.
Figure 8A:
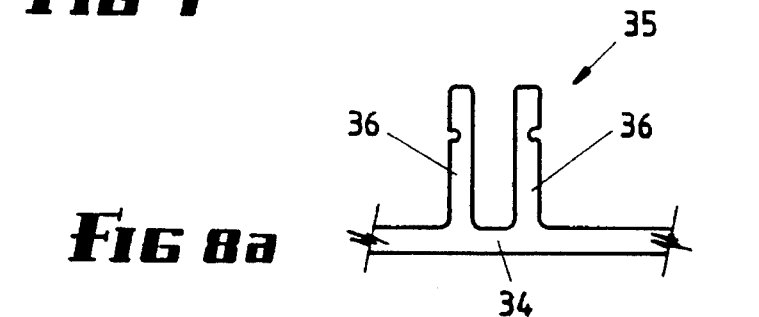
Figure 8B:
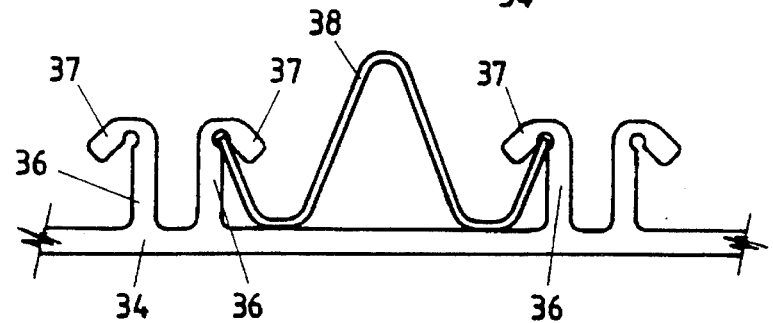
Figure 9A:
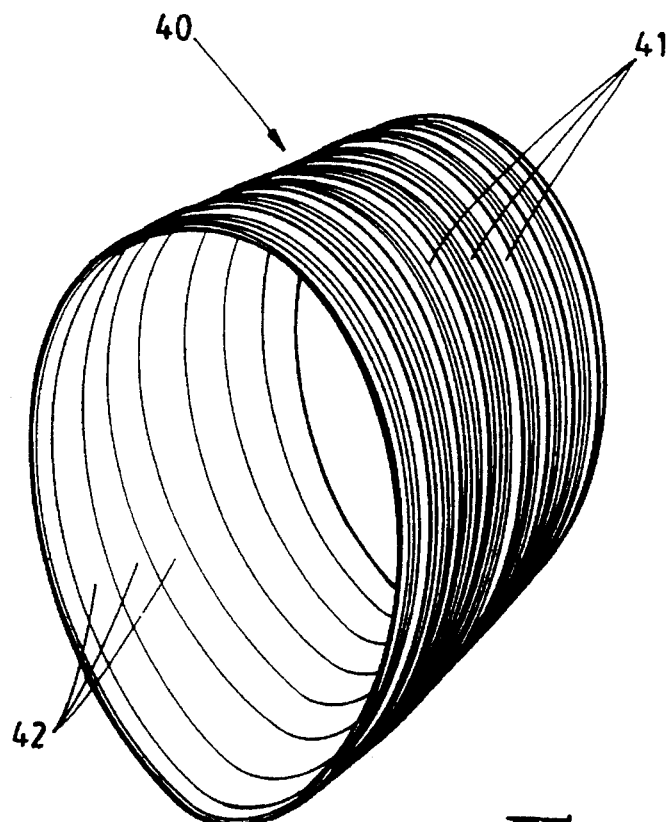
Figure 9B:
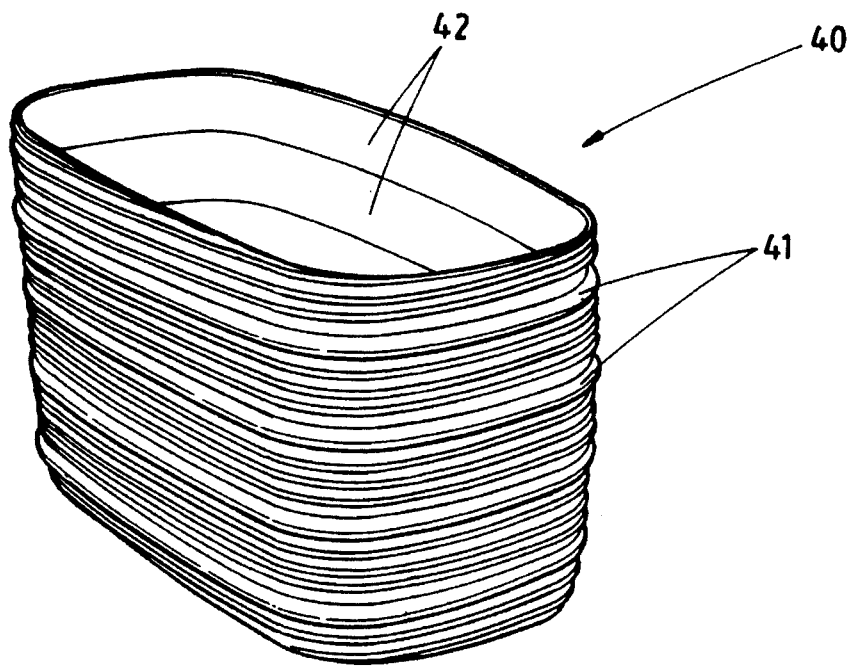

FIGS. 8(a) and 8(b) depicts a plastics strip wherein the ribs are designed to be deformed during the winding process, and form hook formations which lockingly retain the free marginal edges of the reinforcing member; whilst FIGS. 9(a) and 9(b) show two non-circular tubular pipes formed by deforming the composite pipe or tube shown in FIGS. 1 and 2, such that the metal reinforcing members are permanently deformed.

Referring to the embodiment shown in FIGS. 1 and 2, there is shown a spirally wound composite pipe comprising a plastics ribbed strip 10 and a metal reinforcing member 11 inserted between a pair of adjacent T-shaped ribs 15 on the strip 10 and retained therebetween by virtue of the locking engagement between the flanges 14 on the free ends of the ribs 15 and the marginal edges of the member 11. The reinforcing member 11 is roll-formed of metal strip and has a cross-section which is approximately W-shaped, the member 11 having an inverted V-shaped central body portion which projects radially beyond the expanded ends of the ribs 15, to thereby substantially increase the effective external diameter of the wound pipe. This greatly stiffens the pipe and renders it suitable for applications where the pipe is subjected to internally/externally applied forces which might otherwise locally deform the pipe wall, e.g. in underground uses where the pipe is buried.

Figure 3:
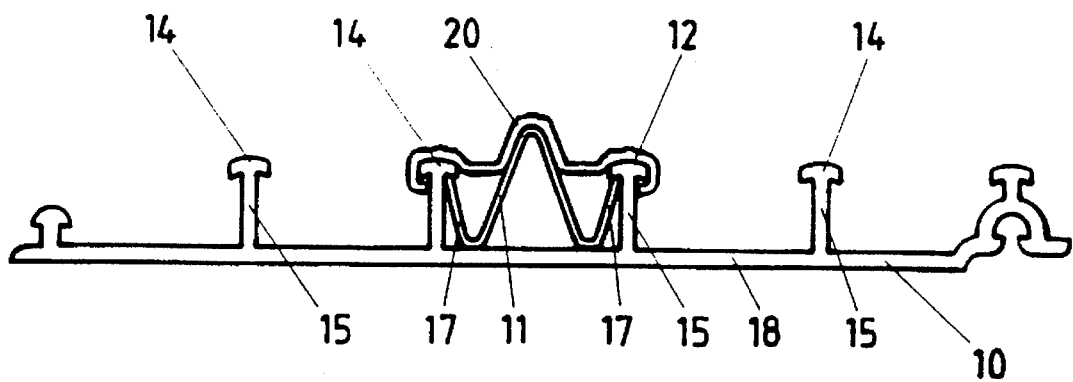
FIGS. 3 to 5 are partly sectioned elevational views illustrating three further embodiments of the invention.

Referring to FIG. 3 which is a partly sectioned elevational view, there is shown a customary strip 10 as generally used to produce spirally wound pipe or tube, in combination with a metal reinforcing member 11 together with a cover strip 12 which overlies the reinforcing member 11. The reinforcing member 11 is, again, roll-formed of steel strip and has a cross-section which is approximately W-shaped. The strip 11 has an inverted U or V-shaped central body portion extending radially beyond the flanges 14 formed at the upper ends of the upstanding ribs 15. This arrangement produces a high degree of stiffness in the finished pipe. The sides of the reinforcing member 11 are splayed outwardly and form outwardly divergent flanges 17 each of which extends between the underside of a flange 14 and the base wall 18 of the strip 10. In this embodiment the reinforcing member 11 is inserted between a pair of adjacent ribs 15 of a helically wound tube being formed, and generally extends across the space between the ribs 15 to be held in locking engagement therebetween.

The cover strip 12, in this embodiment, is produced from recycled plastics material and is provided with a central top hat section 20 which snugly fits over the crest of the central body portion of the reinforcing member 11, the cover strip 12 being formed with marginal channel formations designed to snap-fittingly engage with flanges 14 on the upper ends of the ribs 15.

If desired, the voids formed between the cover strip 12 and the reinforcing member 11 can be filled with filler material applied prior to fitting the cover strip 12, such filler material being compatible with the plastics material of both the strip 10 and cover strip 12. The filler material can be designed to add extra strength and protective features.

It should be appreciated that the spirally wound pipe formed from the plastic strip 10 may have only the cover strip 12 applied to its outer wall, and hence be produced without the reinforcing member 11, which affords less stiffness and rigidity in comparison to the assembly shown in FIGS. 1–3. The top hat section 20 forms a strengthening rib in the cover strip 12 which, when fitted to the ribs 15, adds to the deflection strength of the finished tube. Again, filler material may be inserted into the space between the ribs 15 prior to the cover strip 12 being applied.

Figure 4:
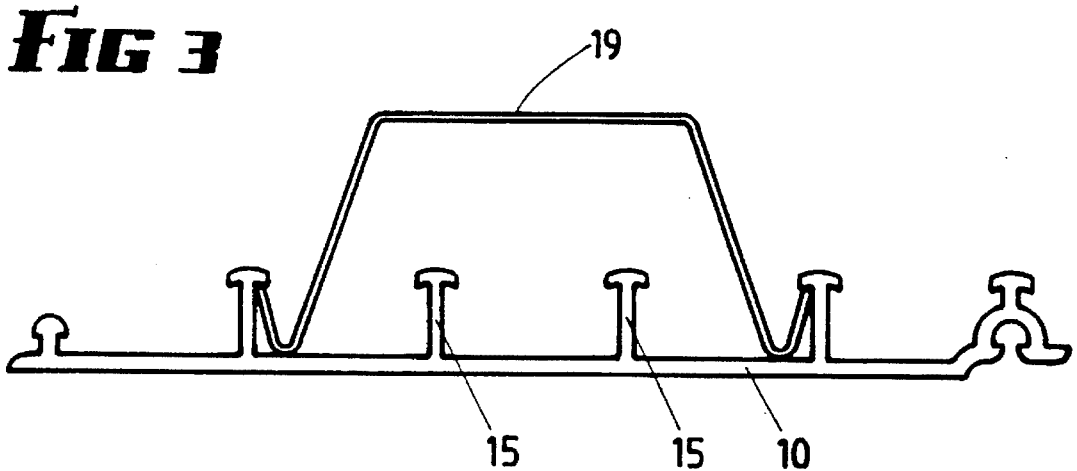

Referring to FIG. 4 of the drawings, metal reinforcing member 19 envelops a pair of ribs 15, and is designed to significantly enhance the stiffness of the composite pipe, the radial height of the member 19 being substantially greater than that of the ribs.

Figure 5:
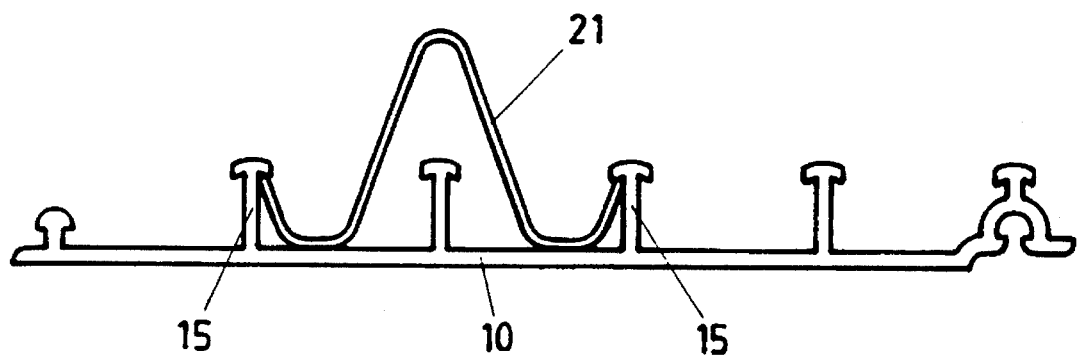

Referring to FIG. 5 of the drawings, the assembly is similar to that shown in FIG. 1; however, the reinforcing member 21 is shaped and dimensioned so as to extend between a pair of alternate ribs 15, the inverted U or V-shaped central body portion of the reinforcing member 21 being dimensioned to straddle an intermediate rib 15. It is a feature of the reinforcing members 11, 21 that they effectively increase the external diameter of the finished tube or pipe and significantly increase its stiffness.

The reinforcing member 21 can be encased in plastics material so as to produce a monolithic composite which can be of roll-formed steel and recycled plastic.

The method of production of the reinforced tube or pipe is substantially identical to that described and illustrated in the applicant's aforesaid Australian Patent 607431, the content of which is hereby incorporated by reference. The metal strip reinforcing member 11, 21 and/or plastic cover strip 12 are preferably applied to the wound tube as it exits from the winding machine; however, the method of application can vary widely with the members 11, 20, 21 being fed continually or at required intervals. It should also be readily appreciated that the interlock between adjacent edge portions of the convolutions of the strip 10 can be effected by means of a separate locking or joining strip fed into the winding machine simultaneously with the plastics strip—rather than having the locking formations integrally formed along opposite edges of the strip 10.

Figure 6:
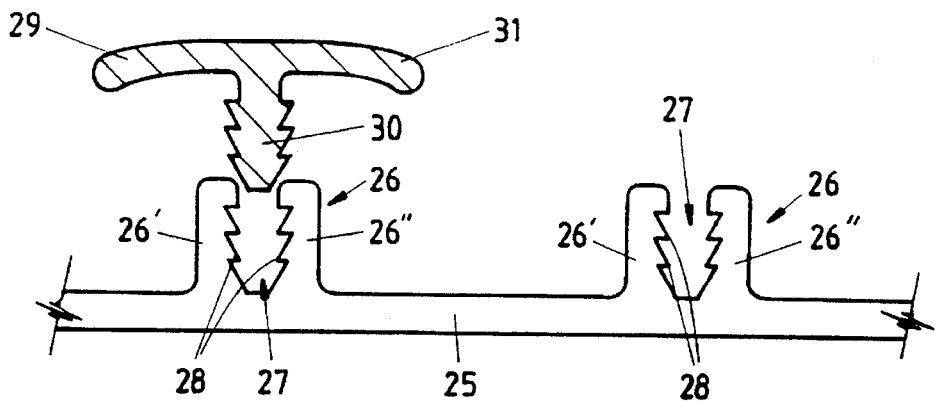
FIGS. 6 and 7 are partly sectioned elevational views showing two further embodiments of the invention, wherein each rib formation on the plastics strip is formed as a female element.

Referring to FIG. 6 of the drawings, there is shown a plastics strip 25 having longitudinally extending upstanding rib formations 26 spaced apart across the width of the strip, each rib formation 26 comprising a pair of opposed ribs 26', 26" closely spaced apart so as to form a longitudinally extending cavity 27 which opens outwardly. The inner faces of the ribs 26', 26" are provided with longitudinally running barbs 28. A T-shaped reinforcing member 29 has a central barbed stem 30 which depends from a top wall 31, the stem 30, during the manufacture of the pipe, being press fitted into a cavity 27 and lockingly retained therein by interengagement of the barbs. Again, the reinforcing member 29 is preferably applied to the spirally wound pipe or tube as it exits from the winding machine but this, as explained previously, may be done in a number of different ways, as would be well-known by those skilled in the art.

Figure 7:
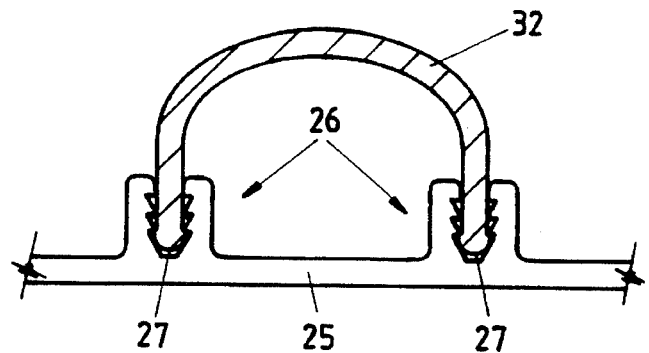

Referring to the embodiment shown in FIG. 7, the strip 25 is identical to that shown in FIG. 5; however, in this instance the profile of the reinforcing member 32 which can be of roll-formed steel or of fibrous material, is of inverted U shape, with the free edge portions of the member 32 being inserted into respective cavities 27 of a pair of adjacent rib formations 26 and lockingly retained therein. To ensure retention of the edge portions of the member 32 within the cavities 27, the opposite edges of the member 32 can be provided with serrations or be expanded. Again, the void formed between the inner surface of the member 32 and the outer surfaces of the strip 25 can be filled with filler material of recycled plastics material.

In the embodiment shown in FIGS. 8(*a*), 8(*b*), the plastic strip 34 is formed with upstanding rib formations 35, each rib formation 35 comprising a pair of closely spaced apart vertical ribs 36 each of which is provided with a predetermined bending point—in this embodiment formed by a reduced thickness portion formed intermediate its upper and lower ends. After the winding operation, the ribs 36 are deformed as shown in FIG. 8(*b*) so as to provide a hook formation at the upper end thereof. The hook formations 37 provide retention means for lockingly retaining a reinforcing member 38 of the kind similar to that described in FIG. 1 hereinabove, in the space between opposed facing ribs 36 of a pair of adjacent rib formations 35.

In the embodiments shown in FIGS. 9(*a*) and 9(*b*), the spirally wound reinforced plastics pipe shown in FIG. 1, has been subjected to a deformation process so that the pipe 40 assumes a non-circular shape e.g. oval or quadrilateral, with the metal reinforcing member(s) 41 having been stretched beyond the elastic limit of the metal.

The helically wound plastics strip 42 is retained in its non-circular shape by means of the permanently deformed metal reinforcing member 41 positioned around its outer wall. The composite pipe takes the same peripheral shape as that of the reinforcing member 41 without the need of heat to deform the tube-forming plastics strip.

The deformation process can be carried out by applying a compressive load to the outside of the circular pipe or tube or an internal tensile load so as to stretch diametrically opposite portions of the pipe apart. In the case of a compressive load, one can simply "squeeze" the pipe between a pair of parallel, opposed press plates so as to plastically deform the helical reinforcing member into a non-circular, e.g. oval, shape, the plastic tubular strip 42 in turn being retained in that shape by the deformed metal reinforcing band 41.

In the other case, opposed steel formers are placed internally of the undeformed pipe or tube thereof and extend longitudinally thereof and engage diametrically opposite wall portions of the pipe. The formers are then spread apart, e.g. by an hydralic jack, to thereby stretch or elongate the pipe into a non-circular shape, whilst simultaneously plastically deforming the reinforcing member 41. Once elongated and stretched, the pipe 40 takes a permanent non-circular set.

If an egg shape is required, the formers can comprise curved plate-like members, the curvature of one plate being different to that of the other, so that when urged apart sufficiently to deform the member 41, the composite pipe 40 will assume an egg-shaped cross-section. It will of course be appreciated that a large range of different shapes can be produced, including tapered tubes and tubes having an enlarged belled socket end for connection to other tubes in a spigot-socket manner.

In addition, an oval-shaped tube or pipe can be slit longitudinally to produce two channel-shaped channels which are quite stiff and can be used for tunnelling, channels e.g. drains or shelters, just to mention a few examples.

A brief consideration of the above-described embodiments will indicate that the invention provides improved composite plastic pipe which can have varying degrees of stiffness, and which as a result of its combination of light weight and high strength makes it ideal for a wide range of industrial and commercial uses.

I claim:

1. A helically wound composite tube or pipe produced by helically winding a strip of plastics material and interengaging the adjacent convolutions of the strip, wherein the strip comprises an array of lengthwise extending ribs spaced apart across the width of the strip so as to form therebetween a series of open longitudinally extending side-by-side channels, each of at least some of said ribs having flange formations at or near its free end to strengthen such said ribs, each of the flange formations being separated from the flange formation on any adjacent rib, characterized by at least one helical elongate reinforcing member located between a pair of said ribs within the array, the marginal edges of the reinforcing member interlocking respectively with the flange formations of the ribs of said pair, said reinforcing member having a central body portion which has a radial height greater than the height of said ribs whereby the effective external diameter of the composite tube or pipe is substantially greater than the inner diameter of the tube or pipe.

2. A helically wound composite tube or pipe according to claim 1 wherein said central body portion is of inverted U or V-shaped cross-section.

3. A helically wound composite tube or pipe according to either of claims 1 or 2 wherein said reinforcing member is continuous and has a length which is co-extensive with the length of the helically wound tube or pipe.

4. A helically wound composite tube or pipe according to either of claims 1 or 2 wherein said reinforcing member is a roll-formed metal strip.

5. A helically wound composite tube or pipe according to claim 1 wherein said reinforcing member has a profile which comprises an inverted V or U-shaped central body portion flanked on each side by an outwardly directed divergent flange, the free end of each said flange engaging beneath a flange formation of a respective said upstanding rib.

6. A helically-wound composite tube or pipe according to either of claims 2 or 5 wherein said inverted V or U-shaped central body portion straddles at least one of said ribs, whereby the strip reinforcing member spans between at least alternate said ribs.

7. A helically wound composite tube or pipe according to claim 1 wherein said reinforcing member is encased in a resilient or a plastics sheath.

8. A helically wound composite tube or pipe according to claim 1 further comprising an elongate cover strip overlying said reinforcing member and co-extensive therewith, said cover member having opposite marginal edge portions in locking engagement with outer marginal edge portions of the flange formations of a pair of said ribs, said marginal edges of the reinforcing member lockingly engaging the underside of respective marginal inner edge portions of the flange formations of said pair of ribs.

9. A helically wound composite tube or pipe according to claim 8 wherein said cover strip has a central top-hat section which is contiguous with the crest of the central body portion of the reinforcing member.

10. A helically wound composite tube or pipe according to either of claims 8 or 9 wherein said cover member is formed of recycled plastics material.

11. A reinforced tubular structure comprising a tube formed from a helically wound elongate strip of plastics material with the adjacent edges of the convolutions of the strip being interlocked, wherein said strip comprises a plurality of longitudinally extending rib formations spaced apart across the width of the strip on at least one side thereof to form therebetween a series of open longitudinally extending side-by-side channels, each said rib formation comprising a pair of opposed closely spaced upstanding ribs which define therebetween an outwardly facing slot-like cavity, and a helical elongate reinforcing member wound around said helically wound strip, said reinforcing member having a leg portion which is lockingly retained within said slot-like cavity.

12. A reinforced tubular structure according to claim 11 wherein the opposite inner walls of the slot-like cavity are provided with barbs or teeth.

13. A reinforced tubular structure according to either of claims 11 or 12 wherein said reinforcing member is of T-shaped cross-section, the vertical limb or leg of which is preferably barbed, said vertical leg or limb being press fitted into the slot-like cavity to thereby lock the reinforcing member to the outer wall of the tube.

14. A reinforced tubular structure according to either of claims 11 or 12 wherein said reinforcing member has an approximately inverted U-shaped cross-section, said reinforcing member spanning between and having its free ends lockingly retained in respective slot-like cavities of adjacent said rib formations, the bridge portion of the reinforcing member being spaced radially outwards of the end surfaces of said ribs.

* * * * *